United States Patent
Uehara et al.

(10) Patent No.: US 9,488,279 B2
(45) Date of Patent: Nov. 8, 2016

(54) METHOD FOR FABRICATING SHAFT SEALING DEVICE AND JIG FOR FABRICATING SHAFT SEALING DEVICE, AND ROTARY MACHINE PROVIDED WITH SHAFT SEALING DEVICE

(75) Inventors: Hidekazu Uehara, Tokyo (JP); Tanehiro Shinohara, Tokyo (JP); Takashi Nakano, Tokyo (JP); Shin Nishimoto, Tokyo (JP)

(73) Assignees: MITSUBISHI HEAVY INDUSTRIES, LTD., Tokyo (JP); EAGLE INDUSTRY CO., LTD., Tokyo (JP)

( * ) Notice: Subject to any disclaimer, the term of this patent is extended or adjusted under 35 U.S.C. 154(b) by 1064 days.

(21) Appl. No.: 13/583,756

(22) PCT Filed: Apr. 28, 2011

(86) PCT No.: PCT/JP2011/060366
§ 371 (c)(1),
(2), (4) Date: Sep. 10, 2012

(87) PCT Pub. No.: WO2011/142270
PCT Pub. Date: Nov. 17, 2011

(65) Prior Publication Data
US 2013/0004310 A1 Jan. 3, 2013

(30) Foreign Application Priority Data
May 10, 2010 (JP) .................................. 2010-108691

(51) Int. Cl.
*F04D 29/04* (2006.01)
*B23P 15/00* (2006.01)
(Continued)

(52) U.S. Cl.
CPC .......... *F16J 15/3292* (2013.01); *F01D 11/001* (2013.01); *F01D 11/02* (2013.01); *F05D 2240/59* (2013.01); *Y10T 29/49826* (2015.01); *Y10T 29/53* (2015.01)

(58) Field of Classification Search
CPC .... F01D 11/00; F01D 11/001; F01D 11/003; F01D 11/02; F05D 2240/55; F05D 2240/56; F05D 2240/57; F05D 2240/59; Y10T 29/49297
USPC .......................................................... 277/355
See application file for complete search history.

(56) References Cited

U.S. PATENT DOCUMENTS

| 5,780,802 A | 7/1998 | Gnann et al. |
| 6,267,381 B1 | 7/2001 | Wright |

(Continued)

FOREIGN PATENT DOCUMENTS

| CN | 1737414 | 2/2006 |
| EP | 1 626 210 | 2/2006 |

(Continued)

OTHER PUBLICATIONS

Decision to Grant a European Patent issued Oct. 23, 2014 in corresponding European Patent Application No. 11780527.5.
(Continued)

*Primary Examiner* — Dwayne J White
*Assistant Examiner* — Julian Getachew
(74) *Attorney, Agent, or Firm* — Wenderoth, Lind & Ponack, L.L.P.

(57) ABSTRACT

Provided is a method of fabricating a shaft sealing device, in which a plurality of thin plate pieces arranged in a circumferential direction of a rotation shaft are provided and base ends of the thin plate pieces are mutually connected, the method including a stacking step of stacking the plurality of thin plate pieces in one direction, a connecting step of mutually connecting the base ends of the plurality of stacked thin plate pieces to form a stacked body, and a first smoothing step of bringing one lateral end surface of two lateral end surfaces of the stacked body formed by each end portion in a width direction of the plurality of thin plate pieces in contact with a flat surface to smooth the other lateral end surface.

7 Claims, 11 Drawing Sheets

(51) Int. Cl.
*F16J 15/32* (2016.01)
*F01D 11/00* (2006.01)
*F01D 11/02* (2006.01)

(56) References Cited

U.S. PATENT DOCUMENTS

| | | | |
|---|---|---|---|
| 6,343,792 B1* | 2/2002 | Shinohara | F01D 11/001 277/345 |
| 7,334,328 B2* | 2/2008 | Uehara | F16J 15/3292 277/312 |
| 2007/0085277 A1* | 4/2007 | Rhodes | F01D 11/001 277/355 |
| 2008/0048398 A1* | 2/2008 | Baird | F01D 11/003 277/355 |
| 2008/0099999 A1* | 5/2008 | Williams | F16J 15/3292 277/355 |

FOREIGN PATENT DOCUMENTS

| | | |
|---|---|---|
| GB | 2 286 434 | 8/1995 |
| JP | 2002-364755 | 12/2002 |
| JP | 2004-346957 | 12/2004 |
| JP | 2005-002995 | 1/2005 |
| JP | 2005-009618 | 1/2005 |
| JP | 2006-52765 | 2/2006 |
| JP | 2006-112491 | 4/2006 |
| JP | 2006-118585 | 5/2006 |
| JP | 3872800 | 1/2007 |
| JP | 3917993 | 5/2007 |
| JP | 3993536 | 10/2007 |
| JP | 2008-116045 | 5/2008 |

OTHER PUBLICATIONS

International Search Report issued Jul. 19, 2011 in International (PCT) Application No. PCT/JP2011/060366.
Written Opinion of the International Searching Authority issued Jul. 19, 2011 in International (PCT) Application No. PCT/JP2011/060366.
Korean Notice of Decision to Grant issued May 16, 2014 in corresponding Korean Patent Application No. 10-2012-7028051 with English translation.
Chinese Office Action issued May 23, 2014 in corresponding Chinese Patent Application No. 201180020683.1 with English translation.
Supplementary European Search Report issued Sep. 11, 2013 in corresponding European Patent Application No. 11780527.5.

* cited by examiner

FIG. 4
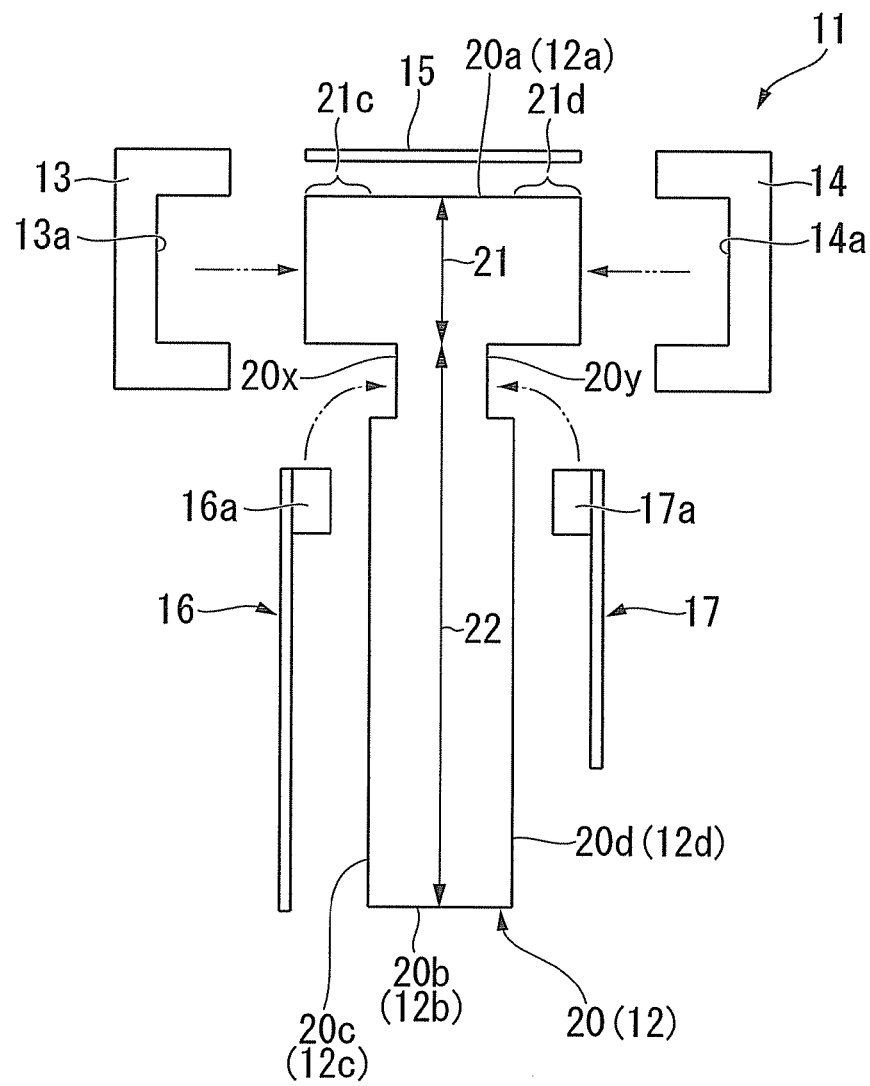
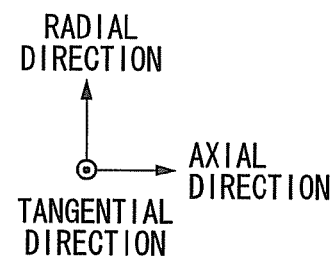

METHOD FOR FABRICATING SHAFT SEALING DEVICE AND JIG FOR FABRICATING SHAFT SEALING DEVICE, AND ROTARY MACHINE PROVIDED WITH SHAFT SEALING DEVICE

TECHNICAL FIELD

The present invention relates to a method of fabricating a shaft sealing device, a jig for fabricating the shaft sealing device, and a rotary machine provided with the shaft sealing device.

This application claims priority to and the benefit of Japanese Patent Application No. 2010-108691, filed May 10, 2010, the disclosure of which is incorporated herein by reference in its entirety.

BACKGROUND ART

As is well known, in a rotary machine such as a gas turbine, a steam turbine, a compressor, a water wheel, a freezing machine, a pump, or the like, a device disclosed in the following Patent Document 1 is provided as a shaft sealing mechanism configured to seal a rotation shaft.

FIG. 14 is a schematic perspective view showing a configuration of a shaft sealing mechanism 100 in the related art.

The shaft sealing mechanism 100 includes a shaft sealing device 102 accommodated in a housing 101 that encloses a rotation shaft R at a stator side of rotary machine.

The shaft sealing device 102 includes a stacked body 103, a high pressure side side sealing plate 104, and a low pressure side side sealing plate 105. The stacked body 103 has a plurality of thin plate pieces 103a stacked along a periphery of the rotation shaft R in a circumferential direction. The high pressure side side sealing plate 104 covers a portion of the stacked body 103 at a high pressure side of the fluid. The low pressure side side sealing plate 105 covers a portion of the stacked body 103 at a low pressure side of the fluid. In the stacked body 103, base end sides of the plurality of thin plate pieces 103a are mutually connected, and tips are free ends. The base end sides of the thin plate pieces 103a are accommodated in the housing 101. Each of the thin plate pieces 103a extends from the housing 101 toward the rotation shaft R to be inclined from a radial direction of the rotation shaft to a tangential direction.

In the shaft sealing mechanism 100 having such a configuration, while the tips of the thin plate pieces 103a contact the rotation shaft R with predetermined pre-compression when the rotation shaft R is stopped, a lifting force is applied to the thin plate pieces 103a by a dynamic pressure effect when the rotation shaft R is rotated. As the lifting force is used, a micro gap is formed by the thin plate piece 103a and the rotation shaft R to seal a working fluid, and wear between the rotation shaft R and each of the thin plate pieces 103a is prevented.

PRIOR ART DOCUMENT

Patent Document

[Patent Document 1] Japanese Patent No. 3917993

SUMMARY OF THE INVENTION

Problems to be Solved by the Invention

Here, in the above-mentioned shaft sealing mechanism, a gas pressure distribution in the micro gap formed between two adjacent thin plate pieces is set to adjust inner diameter dimensions of the high pressure side side sealing plate and the low pressure side side sealing plate. That is, as dimensions of an upstream side space of a fluid introduction part of the micro gap and a downstream side space of a fluid discharge part are adjusted, the gas pressure distribution in the micro gap is set. For example, when the low pressure side side sealing plate is shorter than the high pressure side side sealing plate, the gas pressure distribution in the micro gap is gradually reduced from the tip toward the base end. As a result, the pressure can be applied to the thin plate pieces such that the dynamic pressure effect assists the lifting force.

In the stacked body of the shaft sealing mechanism, normally, after the thin plate pieces are stacked in one direction, base ends of the thin plate pieces are connected by welding or the like, and then a process of bending the thin plate pieces at a predetermined curvature is applied and the shaft sealing device is assembled.

However, in the related art, due to stack distortion generated from some of the thin plate pieces and manufacturing error of each of the thin plate pieces in a process of fabricating the stacked body, local variation in size occurs at an area in the upstream side space or the downstream side space. For this reason, the gas pressure distribution in the micro gap near the area is different from the gas pressure distribution in the micro gap of the other area. Accordingly, lifting characteristics of the thin plate pieces are locally varied, the thin plate pieces and the rotation shaft are worn by contacts therebetween, and sealing performance is decreased.

In consideration of the above-mentioned circumstances, it is an object of the present invention to provide a method of fabricating a shaft sealing device, a jig for fabricating the shaft sealing device, and a rotary machine provided with the shaft sealing device that are capable of suppressing a decrease in seal performance, and suppressing contact wearing between a thin plate piece and a rotation shaft.

Means for Solving the Problems

In order to accomplish the object, the present invention provides the following means.

The present invention provides a method of fabricating a shaft sealing device with a plurality of thin plate pieces arranged in a circumferential direction of a rotation shaft, base ends of the thin plate pieces being mutually connected, the method comprising the steps of: stacking in which the plurality of thin plate pieces are stacked in one direction; connecting in which the base ends of the plurality of the stacked thin plate pieces are mutually connected to form a stacked body; and first smoothing in which an one lateral end surface, which is one of two lateral end surfaces of the stacked body formed on each end portion in a width direction of the plurality of thin plate pieces, is abutted to a flat surface, and the other lateral end surface is smoothed.

According to the above-mentioned configuration, since one lateral end surface of the two lateral end surfaces of the stacked body abuts the flat surface and the other lateral end surface is smoothed, unevenness of the other lateral end surface due to stack distortion or manufacturing error of the thin plate piece can be smoothed. Accordingly, in at least one of an upstream side space of a fluid introduction part of a micro gap formed between the adjacent thin plate pieces and a downstream side space of the fluid discharge part, the space has a uniform size throughout in the circumferential direction. Accordingly, a gas pressure distribution in each micro gap is uniformized. As a result, a local difference in lifting characteristics of the thin plate piece can be suppressed. Accordingly, a decrease in seal performance can be suppressed, and contact wearing between the thin plate piece and the rotation shaft can be suppressed.

In the step of first smoothing, the smoothing may be performed in such a way that a distance between the flat surface and the other lateral end surface is constant.

According to the above-mentioned configuration, since the other lateral end surface is smoothed, the size of at least one of the upstream side space of the fluid introduction part of the micro gap and the downstream side space of the fluid discharge part is further uniformized throughout in the circumferential direction. Accordingly, the gas pressure distribution in each of the micro gaps is further uniformized. As a result, a local difference in lifting characteristics of the thin plate piece can be further suppressed.

The method of fabricating a shaft sealing device of the present invention may further comprise the step of bending in which the stacked body is bended after the step of first smoothing.

According to the above-mentioned configuration, since the method includes the bending step of bending the stacked body after the first smoothing step, the smoothing can be relatively easily performed in comparison with the case in which the bended stacked body is smoothed.

The method of fabricating a shaft sealing device of the present invention may further comprise the step of bending in which the stacked body is bended after the step of connecting, wherein the step of first smoothing is performed to the bended stacked body.

According to the above-mentioned configuration, since the stacked body is bended after the connecting step, even when unevenness occurs from the other lateral end surface by the bending, the other lateral end surface can be smoothed.

The method of fabricating a shaft sealing device of the present invention may further comprise the step of mounting a retainer, in which the retainer that can be fitted to at least a portion of the stacked body at a side of the base end of the thin plate pieces is mounted to the portion of the stacked body after the step of connecting, wherein the step of first smoothing is performed in a state where the retainer is fitted to the stacked body.

According to the above-mentioned configuration, since the smoothing is performed in the first smoothing step in the state in which the retainer is fitted to the stacked body, the base end side of the thin plate piece is held by the retainer so that the smoothing can be relatively easily performed.

In the step of first smoothing, a tip surface of the stacked body formed by tips of the plurality of thin plate pieces is supported.

According to the above-mentioned configuration, since the smoothing is performed in a state in which the tip surface of the stacked body is supported, the tip of the thin plate piece cannot be easily flexed by the smoothing, and the smoothing can be relatively easily and precisely performed.

The method of fabricating a shaft sealing device of the present invention comprises the step of second smoothing in which the one lateral end surface which is abutted to the flat surface in the step of first smoothing is smoothed.

According to the above-mentioned configuration, since the method includes the second smoothing step of smoothing the one lateral end surface, the one lateral end surface is smoothed. Accordingly, since both of the lateral end surfaces of the stacked body are smoothed, the sizes of both of the upstream side space of the fluid introduction part of the micro gap and the downstream side space of the fluid discharge part are uniformized. Therefore, the gas pressure distribution in each of the micro gaps is further uniformized, and local variation in lifting characteristics can be further suppressed. As a result, a decrease in seal performance can be more reliably suppressed, and contact wearing between the thin plate piece and the rotation shaft can be more reliably suppressed.

A jig for fabricating a shaft sealing device of the present invention comprises: a head fitting portion that fits to head portions of the base end sides of the plurality of thin plate pieces; and an abutting flat surface abutting to the one lateral end surface of the two lateral end surfaces of the stacked body formed by each end portion in the width direction of the plurality of thin plate pieces in a state where the head portions of the thin plate pieces are fitted to the head fitting portion.

In addition, a jig for fabricating a shaft sealing device of the present invention comprises: a retainer fitting portion that fits to the retainer fitted to the stacked body; and an abutting flat surface abutting to the one lateral end surface of the two lateral end surfaces of the stacked body formed by each end portion in the width direction of the plurality of thin plate pieces in a state where the retainer is fitted to the retainer fitting portion.

According to these configurations, since the jig includes the fitting portion fitted to the base end of the thin plate piece or the retainer fitting portion fitted to the retainer, and the abutting flat surface abutting the one lateral end surface of the two lateral end surfaces of the stacked body, the thin plate piece can be rapidly and precisely positioned, and the smoothing with respect to the stacked body can be rapidly and precisely performed.

The jig may further comprise a tip abutting portion abutting to a tip surface of the stacked body formed by tips of the plurality of thin plate pieces.

According to the above-mentioned configuration, since the jig includes the tip abutting portion abutting the tips of the plurality of thin plate pieces, the thin plate piece can be more rapidly and precisely positioned. For this reason, the stacking step can be more easily performed, and the smoothing with respect to the stacked body can be more rapidly and precisely performed. Accordingly, the first smoothing step can be more easily performed.

A rotary machine in accordance with the present invention comprises the shaft sealing device, which is fabricated by any one of the above-mentioned methods of fabricating the shaft sealing device and disposed at a periphery of the rotation shaft.

According to the above-mentioned configuration, since the rotary machine includes the shaft sealing device, which is fabricated according to any one of the above-mentioned methods of fabricating the shaft sealing device, in a state in which seal performance with respect to the working fluid is maintained, sealing in the axial direction can be continuously maintained. Accordingly, it is possible to obtain the rotary machine having good maintenance characteristics.

Effects of the Invention

According to a method of fabricating a shaft sealing device of the present invention, it is possible to provide a shaft sealing device capable of suppressing a decrease in seal performance and suppressing contact wearing between a thin plate piece and a rotation shaft.

According to a jig for fabricating a shaft sealing device of the present invention, the method of fabricating a shaft sealing device can be easily performed.

According to a rotary machine of the present invention, maintenance characteristics can be improved.

BRIEF DESCRIPTION OF THE DRAWINGS

FIG. 4 is an exploded view showing a configuration of a seal segment 11 according to the embodiment of the present invention.

DETAILED DESCRIPTION OF THE INVENTION

Hereinafter, embodiments of the present invention will be described with reference to the accompanying drawings.
(Entire Configuration of Gas Turbine)

Figure 1:
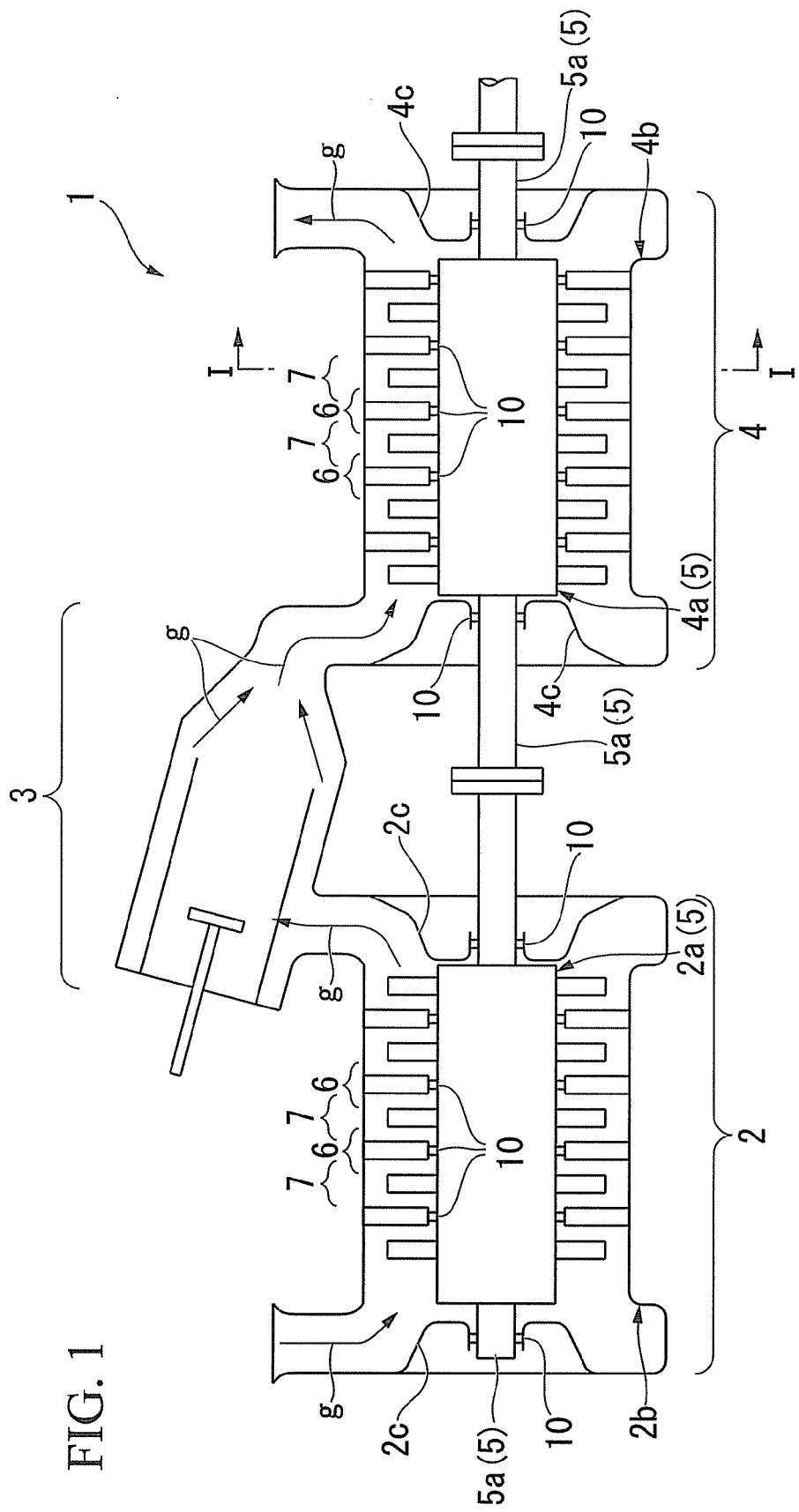
FIG. 1 is a schematic view showing the entire configuration of a gas turbine 1 according to an embodiment of the present invention.
Figure 2:
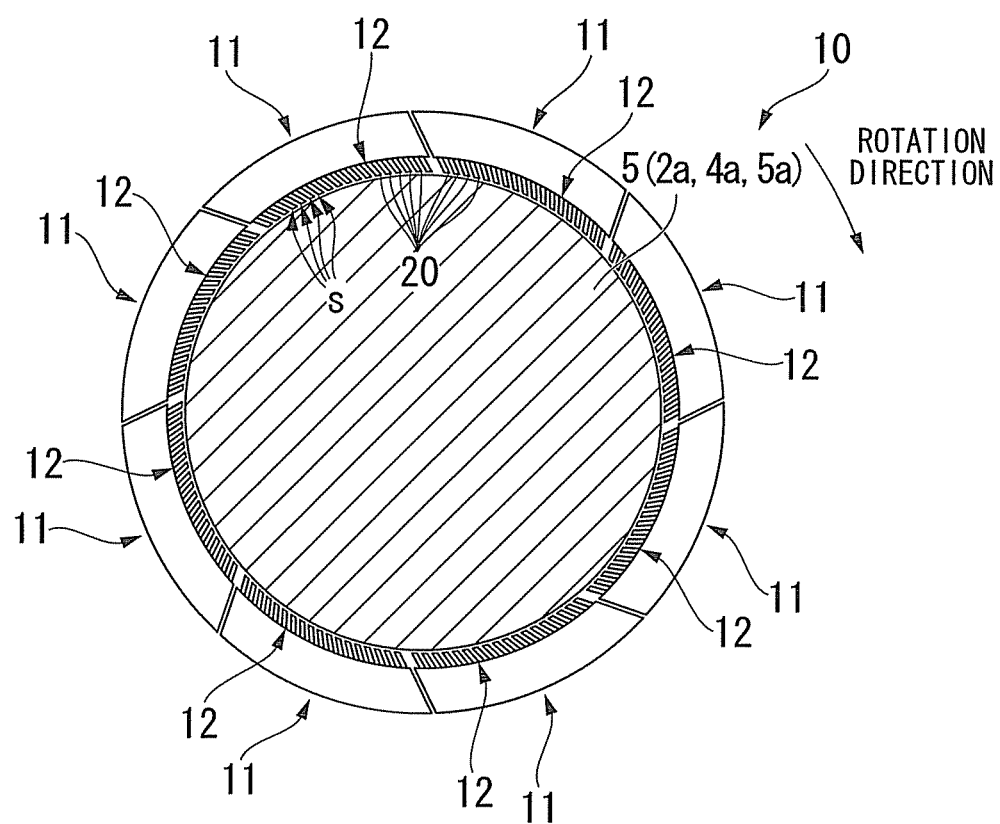
FIG. 2 is a cross-sectional view taken along line I-I of FIG. 1.

FIG. 1 is a schematic view showing the entire configuration of a gas turbine (a rotary machine) 1 according to an embodiment of the present invention, and FIG. 2 is a cross-sectional view taken along line I-I of FIG. 1.

As shown in FIG. 1, the gas turbine 1 includes a compressor (a rotary machine) 2 configured to introduce a large amount of air thereinto and compress the air, a combustor 3 configured to mix fuel with the air compressed by the compressor 2 to combust the mixture, and a turbine (a rotary machine) 4 configured to convert thermal energy of a combustion gas introduced from the combustor 3 into rotational energy. A rotation shaft 5 of the gas turbine 1 is configured by a rotor 2a of the compressor 2, a rotor 4a of the turbine 4 and a rotation shaft 5a, which are coaxially connected to each other.

As shown in FIG. 1, a plurality of stationary blades 6 are installed at inner circumferences of a compressor casing 2b of the compressor 2 and a turbine casing 4b of the turbine 4 in a circumferential direction in an annular shape at predetermined intervals. In addition, a plurality of moving blades 7 are installed at outer circumferences of the rotor 2a of the compressor 2 and the rotor 4a of the turbine 4 in a circumferential direction in an annular shape at predetermined intervals. The stationary blades 6 and the moving blades 7 are alternately arranged in an axial direction of the rotation shaft 5.

In the gas turbine 1, in order to prevent leakage of a working fluid (compressed air or a combustion gas) g from a high pressure side to a low pressure side of the stationary blade 6 in an axial direction, shaft sealing mechanisms 10 are disposed at inner circumferences of the stationary blades 6.

In addition, the shaft sealing mechanisms 10 are also disposed at a bearing part 2c in which the compressor casing 2b supports the rotation shaft 5a, and a bearing part 4c in which the turbine casing 4b supports the rotation shaft 5a.

As shown in FIG. 2, each of the shaft sealing mechanisms 10 is configured by disposing a plurality of (eight, in the embodiment) arc-shaped seal segments (a shaft sealing device) 11 in the circumferential direction of the rotation shaft 5 in an annular shape.
(Configuration of Seal Segment)

Figure 3:
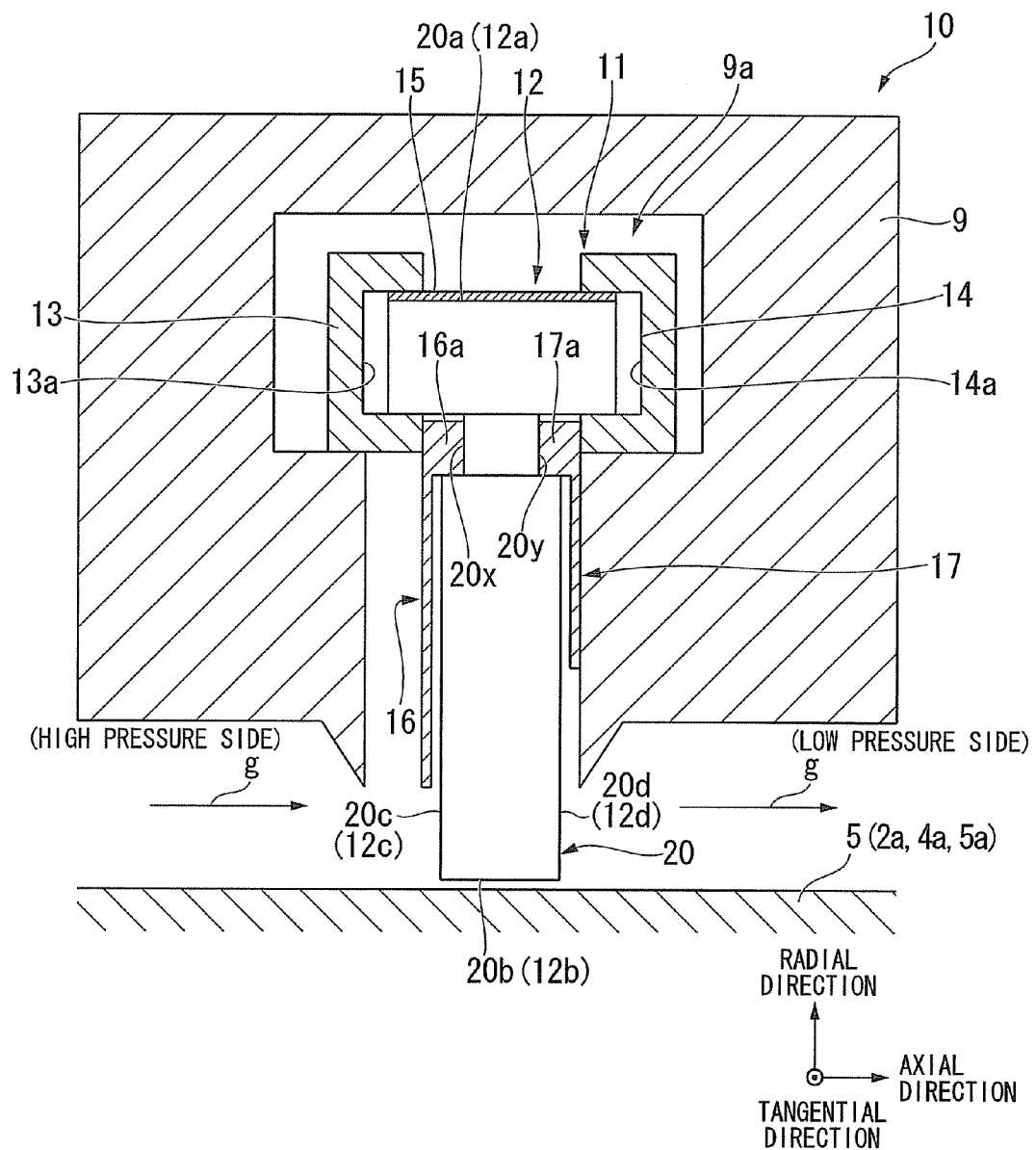
FIG. 3 is a schematic cross-sectional view of a configuration of a shaft sealing mechanism 10 according to the embodiment of the present invention, showing a cross-section along an axis of a rotation shaft 5.

FIG. 3 is a schematic cross-sectional view of a configuration of the shaft sealing mechanism 10, showing a cross-section along an axis of the rotation shaft 5, and FIG. 4 is an exploded view showing a configuration of the seal segment 11 according to the embodiment of the present invention.

As shown in FIG. 3, each of the seal segments 11 is inserted into a housing (corresponding to the stationary blade 6 and the bearing parts 2c and 4c) 9.

As shown in FIG. 3, the seal segment 11 is constituted by a stacked body 12 in which a plurality of thin plate pieces 20 are stacked (see FIGS. 2, 8 and 12), U-shaped retainers 13 and 14 when seen in a cross-sectional view, a rear surface spacer 15, a high pressure side side sealing plate 16, and a low pressure side side sealing plate 17.

In the stacked body 12, the plurality of thin plate pieces 20 are stacked (see FIG. 2), and base end (one end of the thin plate piece 20 outside in a radial direction of the rotation shaft 5) 20a sides of the plurality of thin plate pieces 20 are mutually connected.

As shown in FIG. 3, the thin plate piece 20 is a member formed of a thin steel plate. The thin plate piece 20 has substantially a T shape when seen in a tangential direction of the rotation shaft 5, and a width direction thereof coincides with an axial direction of the rotation shaft 5. As shown in FIG. 4, the thin plate piece 20 includes a head portion 21 of the base end 20a side, and a body portion 22 of a tip (the other end of the thin plate piece 20 outside in the radial direction of the rotation shaft 5) 20b side. The body portion 22 has a width dimension and a thickness dimension smaller than that of the head portion 21. Notch portions 20x and 20y are formed in the body portion 22 adjacent to a boundary with the head portion 21.

Figure 5:
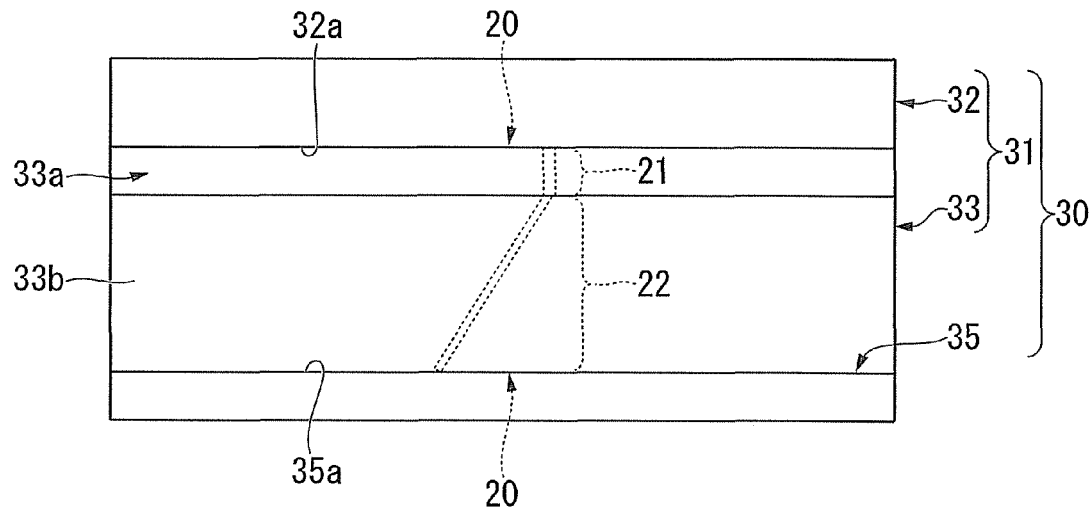
FIG. 5 is a plan view of a fabricating jig 30 used for fabrication of the seal segment 11 according to the embodiment of the present invention.

As shown in FIG. 5, the above-mentioned thin plate piece 20 is bended at the boundary between the head portion 21 and the body portion 22 such that an angle formed by the body portion 22 and the head portion 21 is an obtuse angle. That is, the body portion 22 extends from the head portion 21 in an inclined direction.

The thin plate pieces 20 are mutually connected by welding the lateral protrusion portions 21c and 21d of the head portions 21. The body portion 22 of each of the thin plate pieces 20 can be elastically deformed such that the tip 20b of each of the thin plate pieces 20 has a free end.

In the thin plate piece 20, the thickness of the head portion 21 is larger than that of the body portion 22. For this reason, a micro gap s (see FIGS. 8 and 12) is formed at a position of the body portion 22 between two of the thin plate pieces 20 adjacent to each other in a state in which the thin plate pieces 20 are stacked.

When the plurality of thin plate pieces 20 are stacked, two lateral end surfaces 12c and 12d of the stacked body 12 are formed by each end portion 20c and 20d in a width direction of the body portion 22 of each of the thin plate pieces 20.

Here, the lateral end surface 12c at which the plurality of lateral end portions 20c of the body portions 22 of the thin plate pieces 20 are gathered is directed toward a high pressure side, and the lateral end surface 12d at which the plurality of lateral end portions 20d of the body portions 22 of the thin plate pieces 20 are gathered is directed toward a low pressure side. In this state, the stacked body 12 is inserted into the housing 9. In the stacked body 12, when the rotation shaft 5 is stopped, the tip 20b of each of the thin plate pieces 20 is in contact with the rotation shaft 5 with predetermined pre-compression.

The high pressure side side sealing plate 16 is a fan-shaped plate member when seen in the axial direction of the rotation shaft 5. As shown in FIG. 3, the high pressure side side sealing plate 16 covers a portion of the lateral end surface 12c of the stacked body 12 at the high pressure side in the axial direction of the rotation shaft 5. As shown in FIGS. 3 and 4, a step portion 16a having a large thickness (in the axial direction of the rotation shaft 5) is formed at a base end of the high pressure side side sealing plate 16. The step portion 16a is interposed between the stacked body 12 and the retainer 13 in a state in which the step portion 16a is fitted to the notch portion 20x of the thin plate piece 20.

The low pressure side side sealing plate 17 is a fan-shaped plate member when seen in the axial direction of the rotation shaft 5. As shown in FIG. 3, the low pressure side side sealing plate 17 covers a portion of the lateral end surface 12d of the stacked body 12 at the low pressure side in the axial direction of the rotation shaft 5. A step portion 17a having a large thickness (in the axial direction of the rotation shaft 5) is formed at the base end of the low pressure side side sealing plate 17. The step portion 17a is interposed between the stacked body 12 and the retainer 14 in a state in which the step portion 17a is fitted to the notch portion 20y of the thin plate piece 20.

The low pressure side side sealing plate 17 is shorter than the high pressure side side sealing plate 16 in the radial direction of the rotation shaft. Accordingly, as will be described below, a predetermined gas pressure distribution is formed at the micro gap s.

The retainers 13 and 14 are arc-shaped members extending in the circumferential direction of the rotation shaft 5.

The retainers 13 and 14 have a U-shaped cross-sectional shape when seen in a tangential direction of the rotation shaft 5.

As shown in FIGS. 3 and 4, the retainer 13 has a groove 13a formed at a surface thereof opposite to lateral protrusion portions 21c of the head portions 21 of the plurality of thin plate pieces 20.

As shown in FIGS. 3 and 4, the retainer 14 has a groove 14a formed at a surface thereof facing lateral protrusion portions 21d of the head portions 21 of the plurality of thin plate pieces 20.

As shown in FIG. 3, in the seal segment 11, the retainers 13 and 14 hold the stacked body 12 by the groove 13a of the retainer 13 and the groove 14a of the retainer 14.

The rear surface spacer 15 is interposed between the base end 20a of the thin plate piece 20 and portions of the grooves 13a and 14a of the retainers 13 and 14.

Specifically, the retainers 13 and 14 hold the lateral protrusion portions 21c and 21d of the head portions 21 of the plurality of thin plate pieces 20 and the rear surface spacer 15 by the groove 13a of the retainer 13 and the groove 14a of the retainer 14.

As shown in FIG. 3, the seal segment 11 has a T-shaped cross-section in the tangential direction of the rotation shaft 5. The seal segment 11 is accommodated in an annular groove 9a having a T-shaped cross-section in the tangential direction of the rotation shaft 5 formed at the housing 9. Specifically, the retainers 13 and 14 and the head portions 21 of the thin plate pieces 20 are accommodated in an area having a large groove width (in the axial direction of the rotation shaft 5) at an outer circumference side in the radial direction of the annular groove 9a, and the high pressure side side sealing plate 16 and the low pressure side side sealing plate 17 and the body portions 22 of the thin plate pieces 20 are accommodated in an area having a small groove width at an inner circumference in the radial direction. Here, the tip 20b of the body portion 22 projects from an opening of the annular groove 9a toward the rotation shaft 5.

(Jig for Fabrication of Seal Segment)

Next, a jig used for fabrication of the seal segment 11 according to the embodiment of the present invention will be described.

Figure 6:
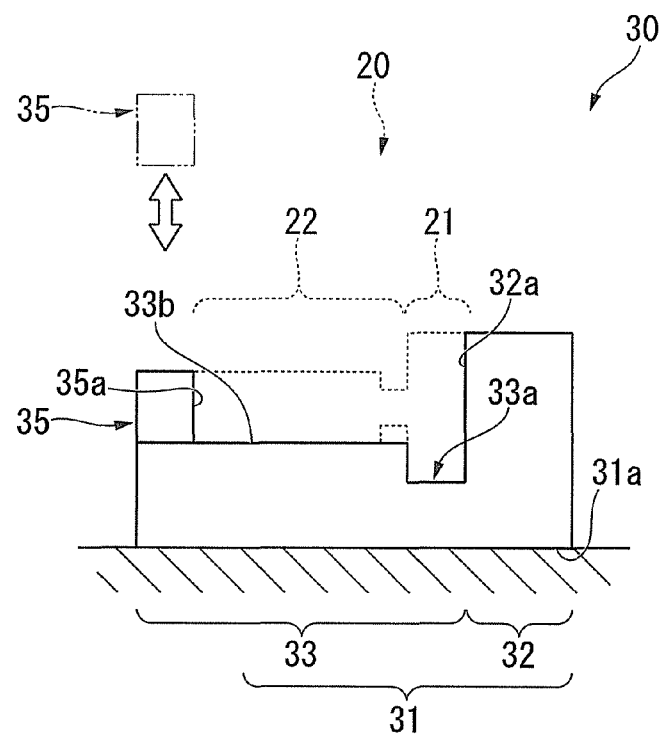
FIG. 6 is a side view of the fabricating jig 30 used for fabrication of the seal segment 11 according to the embodiment of the present invention.

FIG. 5 is a plan view of a fabricating jig 30 used for fabrication of the seal segment 11 having the configuration, and FIG. 6 is a side view of the fabricating jig 30.

As shown in FIGS. 5 and 6, the fabricating jig 30 includes a jig main body 31 and a tip abutting portion 35 detachable from the jig main body 31.

As shown in FIG. 6, the jig main body 31 has a block member having a substantially L-shaped cross-section. The jig main body 31 includes an abutting flat surface portion 33 and a base end abutting portion 32 having a larger thickness (a distance from the bottom surface 31a to an upper surface of the base end abutting portion 32) than a thickness dimension (a distance from a bottom surface 31a to an upper surface of the abutting flat surface portion 33) of the abutting flat surface portion 33.

As shown in FIGS. 5 and 6, at a portion of the abutting flat surface portion 33 having a predetermined width from a boundary between the abutting flat surface portion 33 and the base end abutting portion 32, a groove portion (a head fitting portion) 33a having a smaller thickness (a distance from the bottom surface 31a to the upper surface of the abutting flat surface portion 33) than the other portion of the abutting flat surface portion 33 is formed.

As shown in FIG. 6, the groove portion 33a has a groove cross-section of a substantially rectangular shape. The groove portion 33a and the lateral protrusion portions 21c and 21d (see FIG. 4) of the head portion 21 of the thin plate piece 20 are formed to enable fitting.

As shown in FIG. 6, an abutting flat surface 33b of the abutting flat surface portion 33 abuts the lateral end portion 20c of the thin plate piece 20 in a state in which the lateral protrusion portion 21c of the head portion 21 of the thin plate piece 20 is fitted to the groove portion 33a. In addition, the abutting flat surface 33b of the abutting flat surface portion 33 abuts the lateral end portion 20d of the thin plate piece 20 in a state in which the lateral protrusion portion 21d of the head portion 21 of the thin plate piece 20 is fitted to the groove portion 33a.

As shown in FIGS. 5 and 6, the base end abutting portion 32 has a base end abutting surface 32a continuously formed at the groove portion 33a in a normal direction of the abutting flat surface portion 33. In the base end abutting portion 32, in a state in which any one of the lateral protrusion portions 21c and 21d of the thin plate piece 20 is fitted to the groove portion 33a, the base end 20a of the thin plate piece 20 abuts the base end abutting surface 32a.

As shown in FIG. 5, a length of the tip abutting portion 35 is substantially equal to that of the jig main body 31. As shown in FIG. 6, the tip abutting portion 35 is mounted on the jig main body 31. The tip abutting surface 35a of the tip abutting portion 35 abuts the tip 20b of the thin plate piece 20 in a state in which any one of the lateral protrusion portions 21c and 21d of the thin plate piece 20 is fitted to the groove portion 33a of the jig main body 31.

(Method of Fabricating Seal Segment)

Next, a method of fabricating a seal segment (a method of fabricating a shaft sealing device) according to the embodiment of the present invention will be described.

Figure 7:
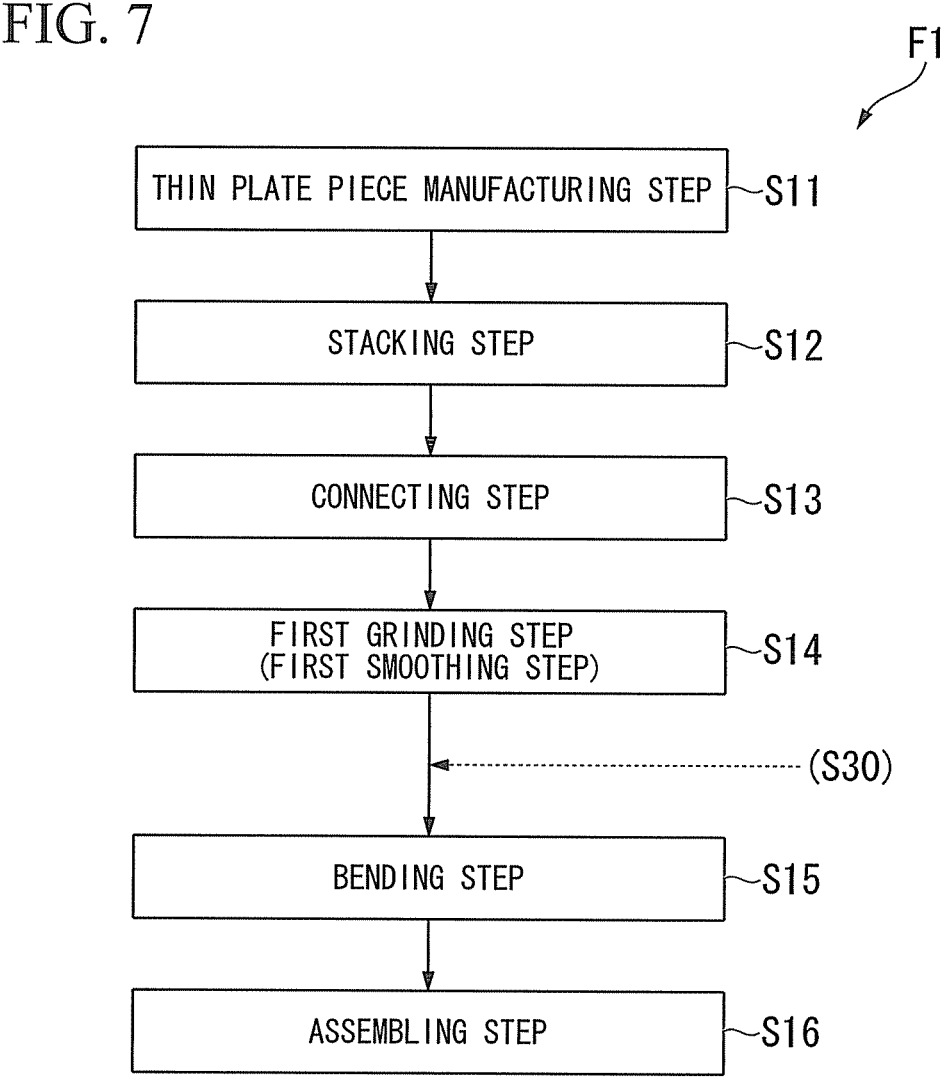
FIG. 7 is a flowchart showing a method F1 of fabricating a seal segment according to an embodiment of the present invention.
Figure 8:
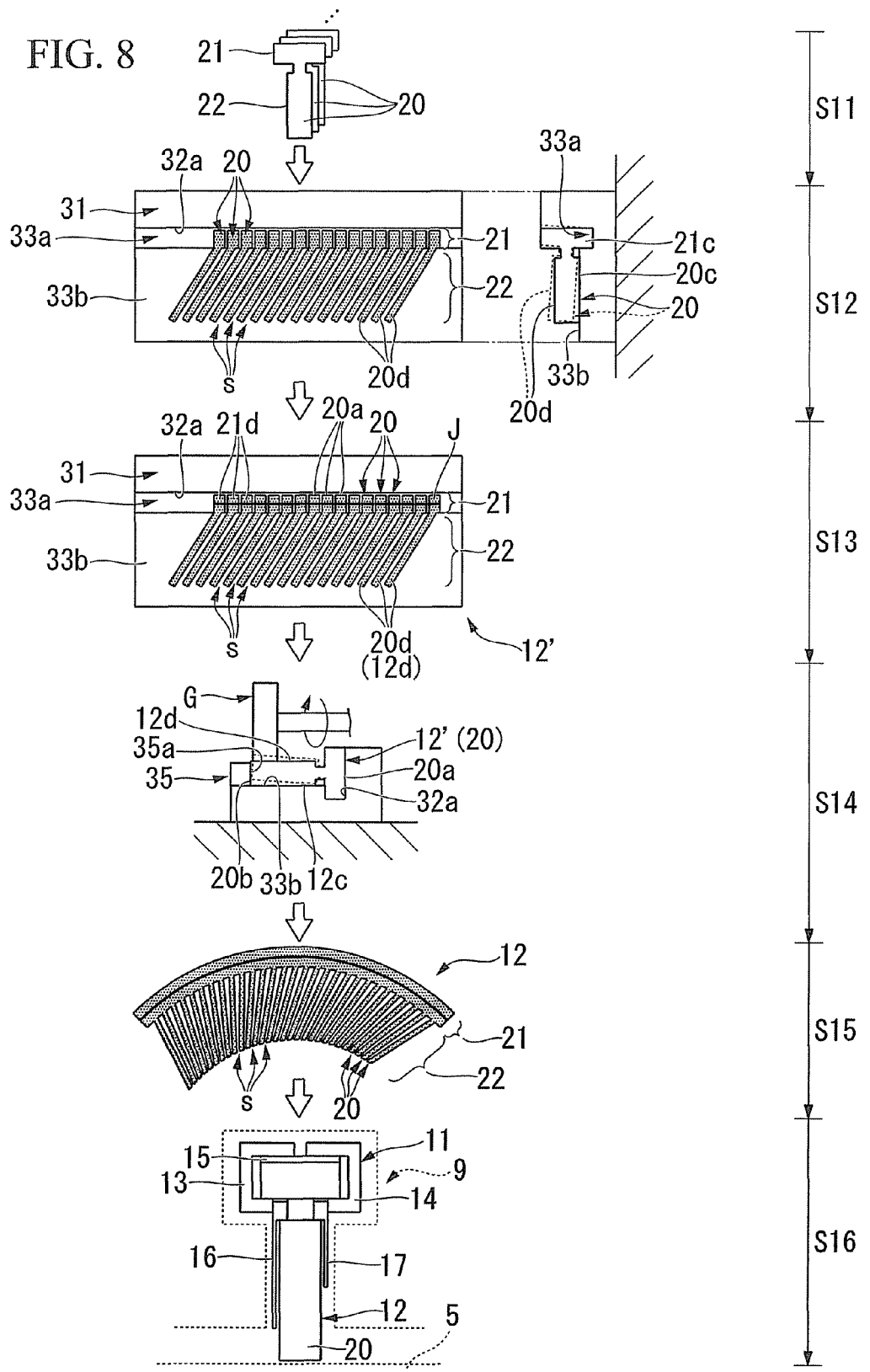
FIG. 8 is a schematic view of a fabricating step of the method F1 of fabricating the seal segment according to the embodiment of the present invention.

FIG. 7 is a flowchart illustrating a method F1 of fabricating a seal segment, and FIG. 8 shows a schematic view showing fabricating steps of the method F1 of fabricating the seal segment.

As described above, the seal segment 11 is constituted by the stacked body 12, the retainers 13 and 14, the rear surface spacer 15, the high pressure side side sealing plate 16, and the low pressure side side sealing plate 17.

First, as shown in FIGS. 7 and 8, a plurality of thin plate pieces 20 formed of a metal plate, which is a base material, are manufactured by a press, etc. (a thin plate piece manufacturing step S11)

Here, only the head portion 21 has a two-ply configuration by folding back the head portion 21 such that the micro gap s is formed between the body portions 22 when the thin plate pieces 20 are straightly stacked. Accordingly, the thickness of the head portion 21 is larger than that of the body portion 22.

Next, as shown in FIG. 7, the plurality of thin plate pieces 20 are straightly arranged and stacked (a stacking step S12).

Specifically, as shown in FIG. 8, the lateral protrusion portion 21c of the head portion 21 of each of the thin plate pieces 20 is fitted to the groove portion 33a of the jig main body 31, and the lateral end portion 20c of the thin plate piece 20 abuts the abutting flat surface 33b of the jig main body 31.

During the stacking step S12, as shown in FIG. 8, when the step is performed in a state in which the tip abutting portion 35 is removed from the fabricating jig 30, the lateral protrusion portion 21c of the head portion 21 is easily fitted to the groove portion 33a of the jig main body 31. In addition, as the lateral protrusion portion 21c of the head portion 21 of each of the thin plate pieces 20 is fitted to the groove portion 33a of the jig main body 31, a posture of the thin plate piece 20 is easily stabilized, and the lateral end portion 20c easily abuts the abutting flat surface 33b.

As shown in FIG. 8, the thin plate pieces 20 are stacked in a width direction of the jig main body 31 such that the body portions 22 of the thin plate pieces 20 extend in the same direction. As the thin plate pieces 20 are stacked as described above, the micro gap s is formed between the body portions 22 of the two adjacent thin plate pieces 20.

Here, as indicated by dotted lines of FIG. 8, a portion of the thin plate piece 20 may slightly protrude upward by stack distortion or manufacturing error of the thin plate piece 20.

Next, as shown in FIG. 7, the base ends 20a of the plurality of thin plate pieces are mutually connected to form a stacked body 12' (a connecting step S13). Specifically, as shown in FIG. 8, the lateral protrusion portions 21d of the head portions 21 of the stacked thin plate pieces 20 are welded to form a linear junction J, mutually connecting the thin plate pieces 20. As a result, the stacked body 12' in which the plurality of thin plate pieces 20 are straightly connected is formed.

Even in this case, some of the thin plate pieces 20 may slightly protrude upward to generate convex portions from the lateral end surface 12d due to distortion of the welding.

After the connecting step S13, the tip abutting portion 35 is mounted on the jig main body 31 (see FIG. 6), and the tip abutting surface 35a abuts the tip 20b of the thin plate piece 20, supporting the tip 20b.

Next, as shown in FIG. 7, the lateral end surface 12c of the stacked body 12 abuts a flat surface, and the other lateral end surface 12d is ground (smoothed) (a first grinding step (a first smoothing step) S14). Specifically, as shown in FIG. 8, in a state in which the lateral end surface 12c abuts the abutting flat surface 33b of the jig main body 31, the lateral end surface 12d is ground by a hand grinder G, etc. Here, a base end surface 12a of the stacked body 12 abuts the base end abutting surface 32a, and a tip surface 12b of the stacked body 12 abuts the tip abutting surface 35a, so that both ends thereof are supported. In this state, even when the grinding is performed, each of the thin plate pieces 20 cannot be easily flexed so that the thin plate pieces 20 cannot be easily tensed or bounced by rotation of the hand grinder G, or the like.

As a result, as the thin plate piece 20 protruding upward among the plurality of thin plate pieces 20 is ground until the thin plate piece 20 is formed to be a flat surface with the other thin plate pieces 20, the uneven lateral end surface 12d is smoothed. In addition, instead of the grinding in the first grinding step S14, the lateral end surface 12d may be smoothed by another machining method (for example, electrical discharge machining).

Next, as shown in FIG. 7, the stacked body 12' is bended to a predetermined curvature (a bending step S15). Specifically, as shown in FIG. 8, the integrally connected head portions 21 are plastically deformed to a predetermined curvature such that the body portion 22 side is recessed, forming the stacked body 12.

Finally, as shown in FIG. 7, the stacked body 12, the retainers 13 and 14, the rear surface spacer 15, the high pressure side side sealing plate 16, and the low pressure side side sealing plate 17 are assembled to complete the seal segment 11 (assembling step S16). Specifically, as shown in FIG. 4, the step portion 16a of the high pressure side side sealing plate 16 and the step portion 17a of the low pressure side side sealing plate 17 are fitted to the notch portions 20x and 20y of the stacked body 12, respectively, and the head portion 21 of the stacked body 12 is fitted to the groove 13a of the retainer 13 and the groove 14a of the retainer 14 via the rear surface spacer 15.

As a result, the seal segments 11 are completed.

(Operation of Seal Segments)

Figure 9:
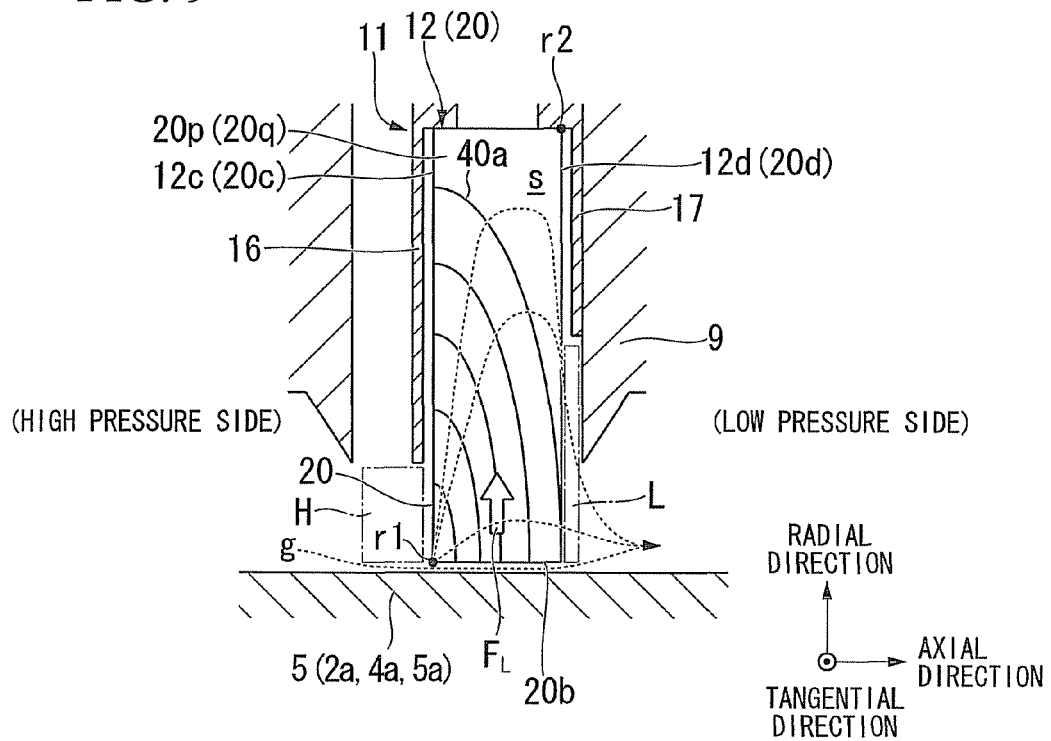
FIG. 9 is a gas pressure distribution view of a working fluid g formed at a micro gap s of the seal segment 11 according to the embodiment of the present invention.
Figure 10:
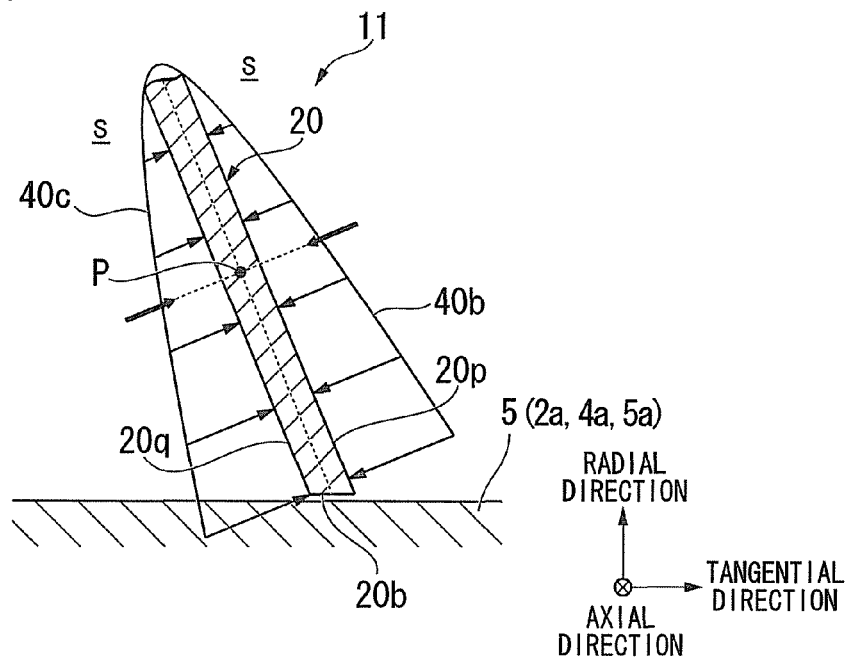
FIG. 10 is a cross-sectional view showing a major part of a body portion 22 of a thin plate piece 20 in the seal segment 11 according to the embodiment of the present invention, showing a cross-section of the body portion 22 crossing the rotation shaft 5 in an axial direction and showing a pressure applied to the body portion 22 as a vector.

Next, an operation of the seal segments 11 fabricated as described above will be described. FIG. 9 is a gas pressure distribution view of a working fluid g formed at the micro gap s, and FIG. 10 is a view showing a cross-sectional view of the body portion 22 crossing in the axial direction of the rotation shaft 5 and pressures applied to the body portion 22 as vectors. Hereinafter, as shown in FIG. 10, a surface facing the rotation shaft 5 of the thin plate piece 20 is referred to as a lower surface 20q, and a rear surface thereof is referred to as an upper surface 20p.

When the gas turbine 1 is operated, a high pressure side region and a low pressure side region of the working fluid g are generated with reference to the shaft sealing mechanism 10 as a boundary.

When the high pressure side region and the low pressure side region are generated, the seal segments 11 receive a pressure from the high pressure side region toward the low pressure side region, and the low pressure side side sealing plate 17 is adhered to the housing 9.

Then, as shown in FIG. 9, the working fluid g flows between an outer circumference surface of the rotation shaft 5 and the tip 20b of the thin plate piece 20, and flows through each of the micro gaps s. That is, the working fluid g introduced into the micro gap s radially flows from a corner r1 toward a corner r2 along the upper surface 20p and the lower surface 20q opposite to each other with the micro gap s interposed therebetween.

That is, as an inner diameter of the low pressure side side sealing plate 17 is larger than that of the high pressure side side sealing plate 16, as shown in FIG. 9, a gas pressure distribution 40a in which a gas pressure is the highest at the corner r1 disposed at the tip 20b of the thin plate piece 20 and the high pressure side, and a gas pressure is gradually reduced toward the corner r2 diagonal thereto is formed.

As shown in FIG. 9, in the gas pressure distribution 40a, a low pressure region is enlarged toward the base end 20a of the thin plate piece 20. For this reason, as shown in FIG. 10, gas pressure distributions 40b and 40c applied to the upper surface 20p and the lower surface 20q of each of the thin plate pieces 20 become triangular distribution shapes in which the gas pressure is increased as they approach the tip 20b of the thin plate piece 20 and is reduced as they approach the base end 20a.

Here, in the seal segment 11, the lateral end surface 12d of the stacked body 12 is smoothed, and a downstream side space L of a discharge part through which the working fluid g is discharged from the micro gap s has the same size at each position in the circumferential direction. That is, in the seal segment 11, as some of the thin plate pieces 20 protruding from the lateral end surface 12d are ground and smoothed like the normally stacked thin plate pieces 20, the downstream side space L has the same size at each position in the circumferential direction.

Here, since the seal segment 11 receives the pressure from the working fluid to be adhered to the housing 9, in order to approach the designed gas pressure distribution, it is needed to precisely secure the size of the downstream side space L of a fluid outlet part more than an upstream side space H of a fluid inlet part of each of the micro gaps s. As described above, each of the micro gaps s in the seal segments 11 secures the downstream side space L of the fluid outlet part to have the same normal size, and the actual gas pressure distribution 40a approximates to the designed gas pressure distribution.

As shown in FIG. 10, while the gas pressure distributions 40b and 40c respectively disposed at the upper surface 20p and the lower surface 20q have substantially the same shape, since the thin plate pieces 20 are disposed to be inclined in the tangential direction of the outer circumference of the rotation shaft 5, a relative position of the gas pressure distributions 40b and 40c at the upper surface 20p and the lower surface 20q is offset. Accordingly, a difference between gas pressures on the upper surface 20p and the lower surface 20q at arbitrary points P from the base end 20a toward the tip 20b of the thin plate piece 20 is generated, and the gas pressure applied to the lower surface 20q is larger than the gas pressure applied to the upper surface 20p. Accordingly, a lifting force $F_L$ is generated in a direction lifting from the rotation shaft 5 with respect to the tip 20b of the thin plate piece 20.

Here, since the actual gas pressure distribution 40a in each of the micro gaps s is substantially equal to the designed gas pressure distribution, the lifting force $F_L$ is also substantially equal to the designed lifting force.

As described above, as the lifting force $F_L$ is applied to the thin plate piece 20 and the lifting force is assisted by a dynamic pressure effect, seal clearance as designed is formed between the thin plate piece 20 and the rotation shaft 5.

As described above, the method F1 of fabricating the seal segment according to the embodiment includes a first grinding step S14 of bringing the lateral end surface 12c directed toward the low pressure side of the working fluid g in contact with the abutting flat surface 33b of the fabricating jig 30 and grinding the lateral end surface 12d directed toward the high pressure side of the working fluid g. For this reason, according to the method F1 of fabricating the seal segment of the embodiment, even when the lateral end surface 12d is uneven due to manufacturing error or stack distortion of the thin plate piece 20 or distortion of the welding, or the like, the lateral end surface 12d is smoothed. Accordingly, the downstream side space L of the micro gap s formed between the body portions 22 of the adjacent thin plate pieces 20 has an uniform size throughout in the circumferential direction. For this reason, the gas pressure distribution in each of the micro gaps s is substantially equal throughout in the circumferential direction. Accordingly, it is possible to suppress a local decrease in lifting characteristics of the thin plate piece 20. As a result, it is possible to suppress a decrease in seal performance and contact wearing between the thin plate piece 20 and the rotation shaft 5.

In addition, in the method F1 of fabricating the seal segment according to the embodiment, in the first grinding step S14, some of the thin plate pieces 20 protruding from the lateral end surface 12d are ground and smoothed like the normally stacked thin plate pieces 20. For this reason, the downstream side space L can be easily configured to have a designed size throughout in the circumferential direction. For this reason, the actual gas pressure distribution in each of the micro gaps s can be easily approximately be to the designed gas pressure distribution.

In addition, the method F1 of fabricating the seal segment according to the embodiment includes a bending step S15 of bending the stacked body 12 after the first grinding step S14. For this reason, when the grinding is performed on the straightly connected stacked body 12, the first grinding step S14 can be relatively easily performed.

Further, in the method F1 of fabricating the seal segment according to the embodiment, the grinding is performed with the tip surface 12b in which the tips 20b of the plurality of thin plate pieces 20 are gathered while being supported. For this reason, it is possible to suppress the tip 20b side of the thin plate piece 20 from being bended by the grinding. As a result, the grinding can be relatively easily and precisely performed.

Furthermore, the fabricating jig 30 of the seal segments 11 according to the embodiment includes the groove portion 33a to which the lateral protrusion portions 21d of the plurality of thin plate pieces 20 are fitted, and the abutting flat surface portion 33 configured to abut the lateral end portions 20c of the plurality of thin plate pieces 20. For this reason, the thin plate piece 20 can be rapidly and precisely positioned, and the stacking step S12 can be easily performed. In addition, the grinding on the lateral end surface 12d of the stacked body 12 can be rapidly and precisely performed, and the first grinding step S14 can be easily performed.

In addition, the fabricating jig 30 of the seal segment 11 according to the embodiment includes the tip abutting portion 35 abutting the tips 20b of the plurality of thin plate pieces 20. For this reason, the thin plate piece 20 can be more rapidly and precisely positioned, and the stacking step S12 can be more easily performed. Further, the grinding on the stacked body 12 can be more rapidly and precisely performed, and the first grinding step S14 can be more easily performed.

Furthermore, since the gas turbine 1 according to the embodiment includes the seal segments 11, the sealing in the axial direction is performed in the state in which the seal performance with respect to the working fluid g is maintained and continuously. Therefore, the maintenance characteristics are improved.

(Variant of Method of Fabricating Seal Segment and Fabricating Jig Used Therein)

Figure 11:
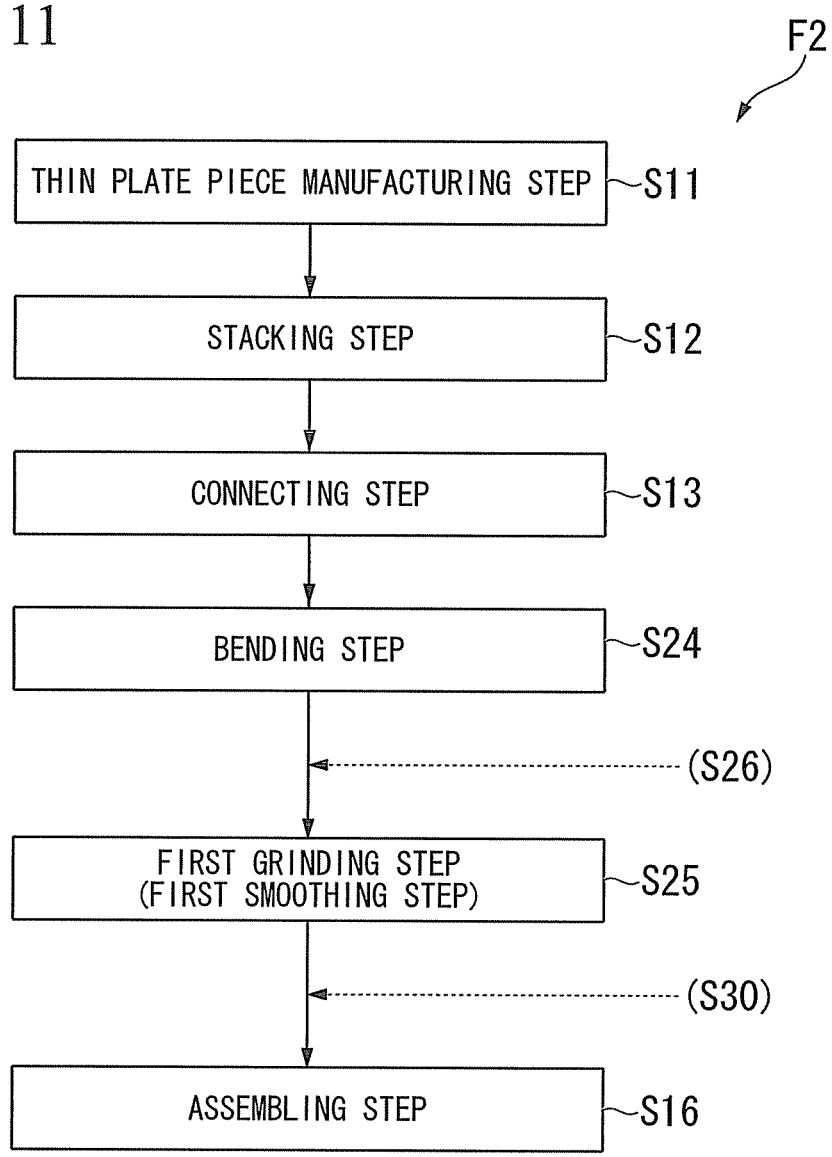
FIG. 11 is a flowchart showing a method F2 of fabricating a seal segment, which is a variant of the method F1 of fabricating a seal segment according to the embodiment of the present invention.
Figure 12:
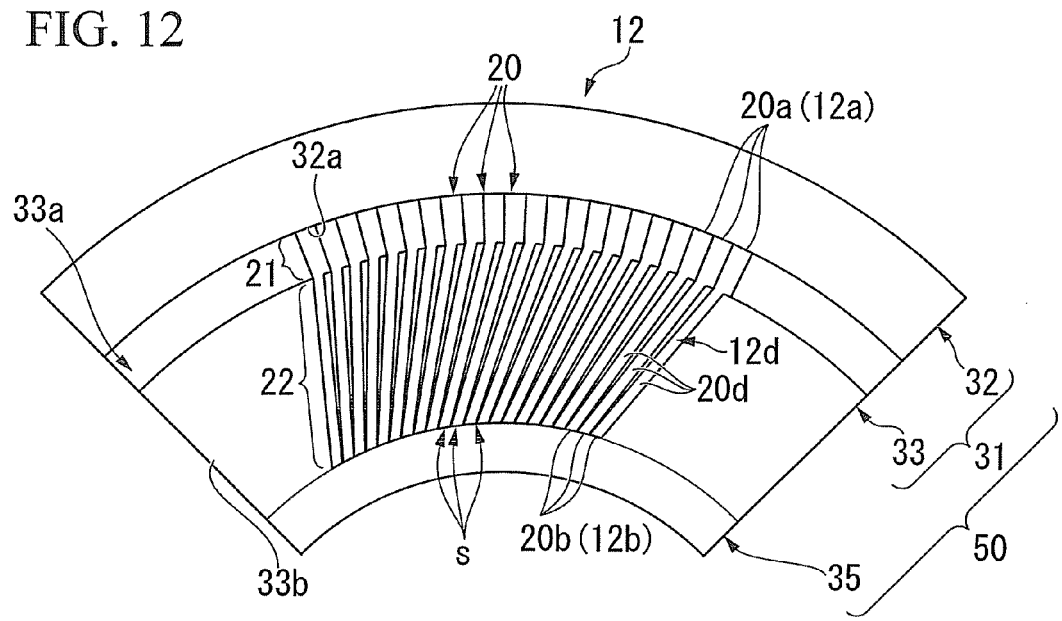
FIG. 12 is a view showing a fabricating jig 50 used for the method F2 of fabricating the seal segment according to the embodiment of the present invention.

FIG. 11 is a flowchart of a method F2 of fabricating a seal segment as a variant of the method F1 of fabricating the seal segment, and FIG. 12 is a plan view of a fabricating jig 50 used therein. In addition, like elements of the above-mentioned embodiment are designated by like reference numerals, and description thereof will not be repeated.

As shown in FIG. 11, the method F2 of fabricating the seal segment is similar to the method F1 of fabricating the seal segment in the thin plate piece manufacturing step S11 to the connecting step S13 of the thin plate piece 20. However, in the method F2 of fabricating the seal segment, unlike the method F1 of fabricating the seal segment, after the connecting step S13 of the thin plate piece 20, the method F2 includes a bending step S24 with respect to the stacked body 12', and a first grinding step (first smoothing step) S25 (see FIG. 7).

In the method F2 of fabricating the seal segment, the fabricating jig 30 can be used until the connecting step S13 of the thin plate piece 20. In the first grinding step S25, not using the straight shaped fabricating jig 30, as shown in FIG. 12, the fabricating jig 50 having a curved shape (a fan shape when seen in a plan view) is used to grind the lateral end surface 12d. In addition, a side view of the fabricating jig 50 is similar to the side view of the fabricating jig 30 of FIG. 6.

Accordingly, since the stacked body 12' is bended after the connecting step S13 and before the first grinding step S25, even when unevenness is generated on the lateral end surface 12d by the bending step S24, the lateral end surface 12d can be smoothed in the first grinding step S25.

Figure 13:
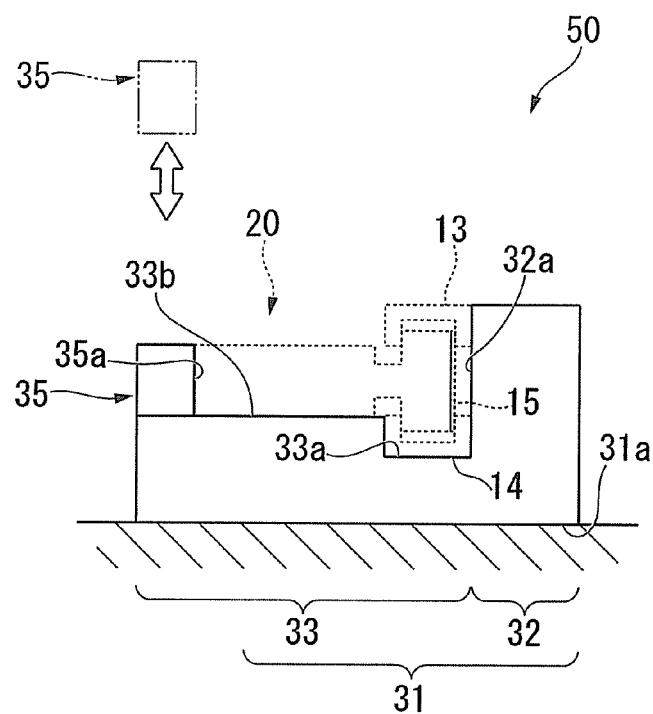
FIG. 13 is a side view of the fabricating jig 50 used for fabrication of the seal segment 11 according to the embodiment of the present invention.
Figure 14:
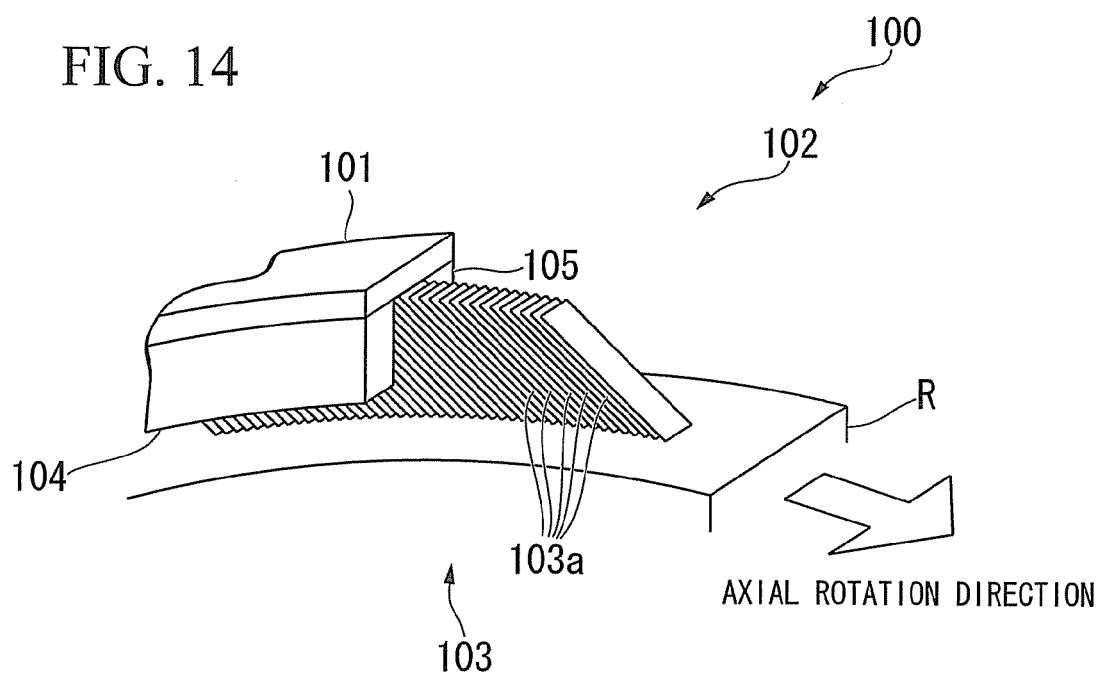
FIG. 14 is a schematic perspective view showing a configuration of a shaft sealing mechanism 100 in the related art.

In addition, the method F2 of fabricating the seal segment may include, after the bending step S24, a pre-assembling step (a retainer mounting step) S26 of assembling the retainers 13 and 14 and the rear surface spacer 15 to the stacked body 12. That is, as shown in FIG. 13, as the head portion 21 of each of the thin plate pieces 20 of the stacked body 12 is fixed and held by the retainers 13 and 14, flexing of the base end 20a side of the thin plate piece 20 can be effectively suppressed. As a result, the grinding can be relatively easily and precisely performed.

Further, in this case, the groove portion 33a of the fabricating jig 50 may be configured to be fitted to the retainers 13 and 14. In this case, in the assembling step S16, the high pressure side side sealing plate 16 and the low pressure side side sealing plate 17 may be inserted in the circumferential direction from one ends thereof to assemble the seal segment 11.

Furthermore, an operational sequence shown in the above-mentioned embodiment or shapes and assemblies of the configuration members are provided as an example, and may be varied based on design requirements without departing from the spirit of the present invention.

In the above-mentioned embodiment, while the grinding is performed on the lateral end surface 12d, the fabricating method may include a second grinding step (a second smoothing step) of grinding the lateral end surface 12c (see S30 of FIGS. 7 and 11). As the lateral end surface 12c is smoothed by the second grinding step S30, as shown in FIG. 9, a size of the upstream side space H of the fluid introduction part of the micro gap s is uniformized throughout in the circumferential direction. Accordingly, a gas pressure distribution in each of the micro gaps s can be further uniformized, and local variation in lifting characteristics can be further suppressed. Accordingly, a decrease in seal performance can be further suppressed, and contact wearing between the thin plate piece 20 and the rotation shaft 5 can be further suppressed. In addition, instead of the grinding step of the second grinding step, the lateral end surface 12c may be smoothed using another machining method (electrical discharge machining).

In the above-mentioned embodiment, while the ground lateral end surface 12d is directed toward the high pressure side region, the lateral end surface 12d may be directed toward the low pressure side region.

In the above-mentioned embodiments, in the first grinding steps S14 and S25, while the protruding thin plate piece 20 is ground along with the non-protruding thin plate pieces 20, to smooth the lateral end surface 12d, the lateral end surface 12d may be ground to be smoothed such that a distance between the abutting flat surface 33b and the lateral end surface 12d is constant. Here, as machining allowance is provided to a width dimension of (the body portion 22 of) the thin plate piece 20 in the thin plate piece manufacturing step S11, excessive grinding of the thin plate piece 20 can be prevented.

In the above-mentioned embodiments, while the first grinding steps S14 and S25 have a configuration in which the hand grinder G is used, another grinding tool and machine tool may be used.

In the above-mentioned embodiment, in the thin plate piece manufacturing step S11, while the thin plate piece 20 is manufactured by a press, the thin plate piece may be manufactured using another method such as etching, or the like. When the thin plate piece is manufactured by the etching, thicknesses of the head portion 21 and the body portion 22 can be directly adjusted, rather than folding the head portion 21.

In the above-mentioned embodiment, while the stacked body 12 in which the thin plate pieces 20 inclined between the head portion 21 and the body portion 22 are stacked is used, a stacked body in which thin plate pieces straightly formed (not inclined) between the head portion 21 and the body portion 22 are stacked may be applied to the present invention.

In the above-mentioned embodiment, while the case in which the seal segments 11 in accordance with the present invention are applied to the gas turbine 1 has been described, for example, the seal segments can be widely applied to rotary machines such as a steam turbine, a compressor, a water wheel, a freezing machine, a pump, and so on.

INDUSTRIAL APPLICABILITY

According to the method of fabricating a shaft sealing device in accordance with the present invention, it is possible to obtain a shaft sealing device capable of suppressing a decrease in seal performance and suppressing contact wearing between the thin plate piece and the rotation shaft.

According to the jig for fabricating the shaft sealing device in accordance with the present invention, it is possible to easily perform the method of fabricating a shaft sealing device.

According to the rotary machine in accordance with the present invention, maintenance characteristics can be improved.

DESCRIPTION OF REFERENCE NUMERALS

1 . . . gas turbine (rotary machine)
2 . . . compressor (rotary machine)
4 . . . turbine (rotary machine)
5 . . . rotation shaft
11 . . . seal segment (shaft sealing device)
12 . . . stacked body
12b . . . tip surface
12c, 12d . . . lateral end surface
13, 14 . . . retainer
20 . . . thin plate piece
20a . . . base end
20b . . . tip
20c, 20d . . . lateral end portion
30, 50 . . . fabricating jig (jig for fabricating shaft sealing device)
33a . . . groove portion (head fitting portion)
33b . . . abutting flat surface
35 . . . tip abutting portion
F1, F2 . . . method of fabricating seal segment (method of fabricating shaft sealing device)
s . . . micro gap
S11 . . . thin plate piece manufacturing step
S12 . . . stacking step
S13 . . . connecting step
S14, S25 . . . first grinding step (first smoothing step)
S15, S24 . . . bending step
S16 . . . assembling step
S26 . . . pre-assembling step (retainer mounting step)
S30 . . . second grinding step (second smoothing step)

What is claimed is:

1. A method of fabricating a shaft sealing device with a plurality of thin plate pieces arranged in a circumferential direction of a rotation shaft, each thin plate piece having first and second lateral end portions on respective opposite ends of the thin plate piece in a width direction, the width direction corresponding to an axial direction of the rotation shaft, base ends of the thin plate pieces being mutually connected, the method comprising:

stacking the plurality of thin plate pieces in one direction;

mutually connecting the base ends of the plurality of the stacked thin plate pieces to form a stacked body having first and second lateral end surfaces on respective opposite ends of the stacked body in the width direction, the first lateral end surface of the stacked body being formed by the first lateral end portions of the thin plate pieces, and the second lateral end surface of the stacked body being formed by the second lateral end portions of the thin plate pieces; and smoothing one of the first and second lateral end surfaces of the stacked body with the other of the first and second lateral end surfaces of the stacked body being abutted to a flat surface.

2. The method of fabricating a shaft sealing device according to claim 1, wherein, the smoothing is performed in such a way that a distance between the flat surface and the one of the first and second lateral end surfaces is constant.

3. The method of fabricating a shaft sealing device according to claim 1, further comprising bending the stacked body after the smoothing of the one of the first and second lateral end surfaces of the stacked body.

4. The method of fabricating a shaft sealing device according to claim 1, further comprising bending the stacked body after the connecting of the base ends of the thin plate pieces, wherein the smoothing of the one of the first and second lateral end surfaces of the stacked body is performed with the stacked body being bent.

5. The method of fabricating a shaft sealing device according to claim 4, further comprising mounting a retainer to at least a portion of the stacked body at a side of the base end of the thin plate pieces after the connecting of the base ends of the thin plate pieces, wherein the smoothing of the one of the first and second lateral end surfaces of the stacked body is performed in a state where the retainer is fitted to the stacked body.

6. The method of fabricating a shaft sealing device according to claim 1, wherein a tip surface of the stacked body formed by tips of the plurality of thin plate pieces is supported during the smoothing of the one of the first and second lateral end surfaces of the stacked body.

7. The method of fabricating a shaft sealing device according to claim 1, further comprising, after the smoothing of the one of the first and second lateral end surfaces of the stacked body.

* * * * *